United States Patent [19]

Hartmann

[11] 4,095,327
[45] Jun. 20, 1978

[54] METHOD OF SECURING A NUT TO A SUPPORT PLATE

[75] Inventor: Erich Hartmann, Hillsdale, N.J.

[73] Assignee: Stauff Corporation, Waldick, N.J.

[21] Appl. No.: 710,224

[22] Filed: Jul. 30, 1976

[51] Int. Cl.² .................. B21D 39/00; B23P 11/00
[52] U.S. Cl. ............................... 29/509; 29/520; 29/525; 151/41.73
[58] Field of Search .................. 29/509, 525, 520; 151/41.73

[56] References Cited

U.S. PATENT DOCUMENTS

| 2,236,720 | 4/1941 | Senf .................. 151/41.73 UX |
| 2,544,304 | 3/1951 | Eckenbeck et al. .......... 151/41.73 |
| 2,944,326 | 7/1960 | Stadthaus et al. .............. 29/509 X |
| 3,185,268 | 5/1965 | Heine .................. 151/41.73 X |
| 3,276,499 | 10/1966 | Reusser .................. 151/41.73 |

Primary Examiner—Charlie T. Moon
Attorney, Agent, or Firm—Carella, Bain, Gilfillan & Rhodes

[57] ABSTRACT

Method of securing a nut to a support plate including the steps of forming an aperture in the support plate complementary to the configuration of the nut, inserting the nut in the aperture, and forcing the nut into frictional engagement with the support plate and swaging peripheral portions of the support plate surrounding the aperture into engagement with and over peripheral portions of one end of the nut to lock the nut into the aperture thereby securing the nut to the support plate.

1 Claim, 6 Drawing Figures

METHOD OF SECURING A NUT TO A SUPPORT PLATE

BACKGROUND OF THE INVENTION

As is known to those skilled in the art of securing a nut, such as a metal nut, to a support plate, such as metal support plate, the prior art methods such as welding and vacuum soldering while satisfactory for many applications still leave much to be desired for many other applications and with regard to many considerations.

More specifically, prior art methods of welding and vacuum soldering are unnecessarily or at least undesirably complex, time consuming and hence expensive for many applications, in particular, those applications where extreme criticality of location, orientation and/or appearance are not present. For example, many items such as pipe or hose clamps are secured to or supported by nuts secured to support plates which support plates are in turn secured to, for example, a wall, bulkhead, I-beam, or other major support structures. In such an example, extreme criticality of location, orientation and/or appearance are not present but yet the support of the, for example, pipe or hose must be mechanically secure.

Accordingly, there exists a great need in the art of securing a nut to a support plate for a simple and inexpensive method which yet provides a strong and mechanically secure structural interconnection between the nut and the support plate.

SUMMARY OF THE INVENTION

Accordingly, it is the primary object of the present invention to provide a simple and inexpensive method of securing a nut to a support plate which provides a strong and mechanically secured interconnection between the nut and the support plate.

The principal feature of the present invention, in satisfying the foregoing object, is that of forming an aperture in the support plate of a configuration complementary to the configuration of the nut, inserting the nut into the aperture, and forcing the nut into frictional engagement with the support plate and swaging peripheral portions of the support plate surroundng the aperture into engagement with and over peripheral portions of one end of the nut to lock the nut into the aperture and thereby securing the nut to the support plate.

DESCRIPTION OF THE INVENTION

Figure 1:
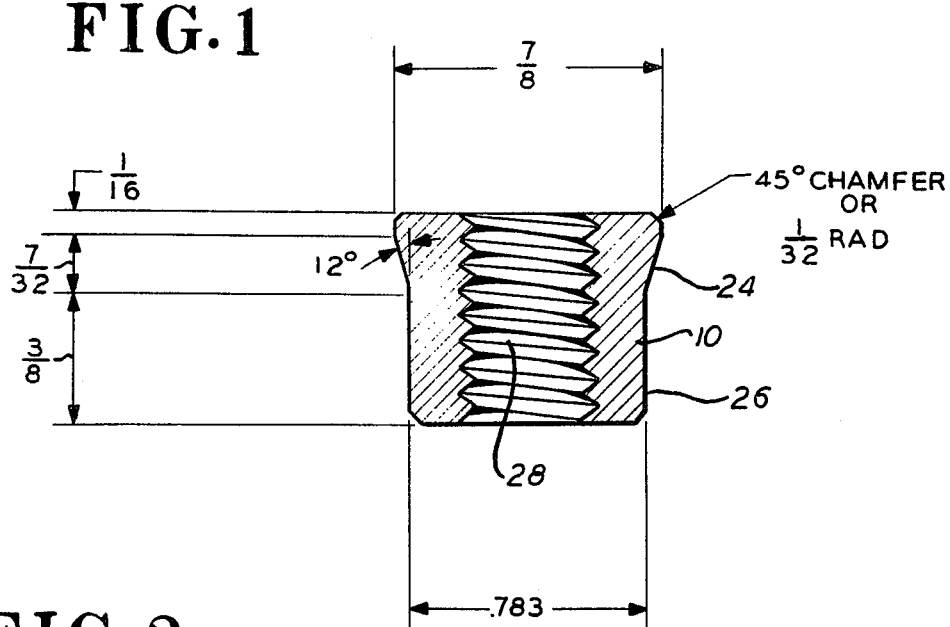
FIG. 1 is a cross-sectional view of a nut which may be utilized in the practice of the present invention.
Figure 2:
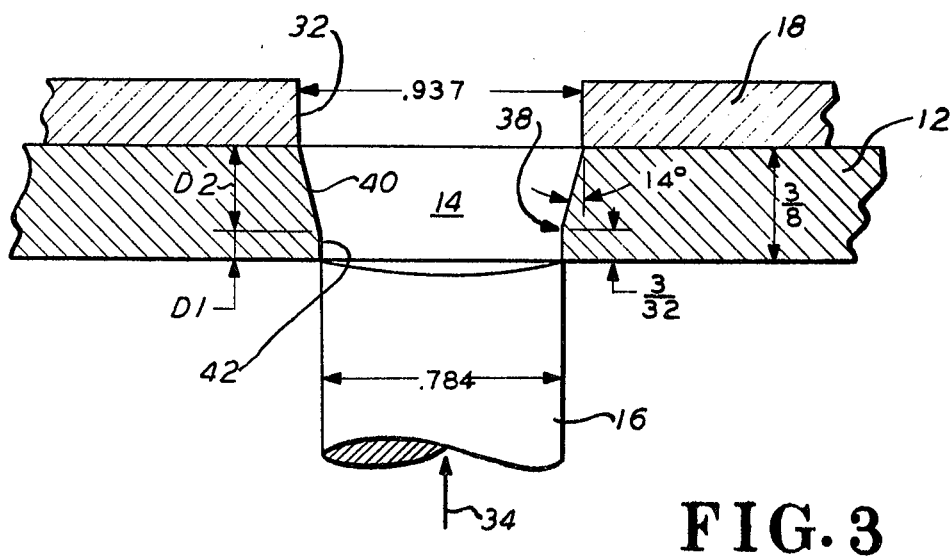
FIG. 2 is a cross-sectional view of a support plate having an aperture formed therein.

Referring now generally to FIGS. 1 and 2, and in general to the method of the present invention, the present invention provides a method of securing a nut, such as nut 10 of FIG. 1, to a support plate, such as the support plate 12 of FIG. 2.

Figure 4:
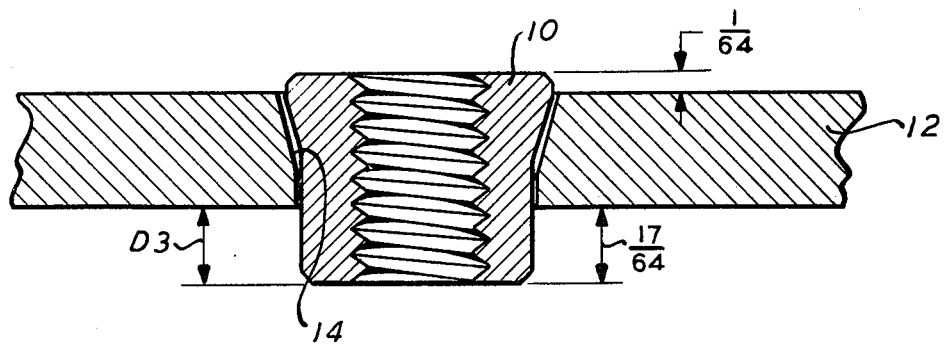
FIG. 4 illustrates the nut being inserted into the aperture formed in the support plate.
Figure 5:
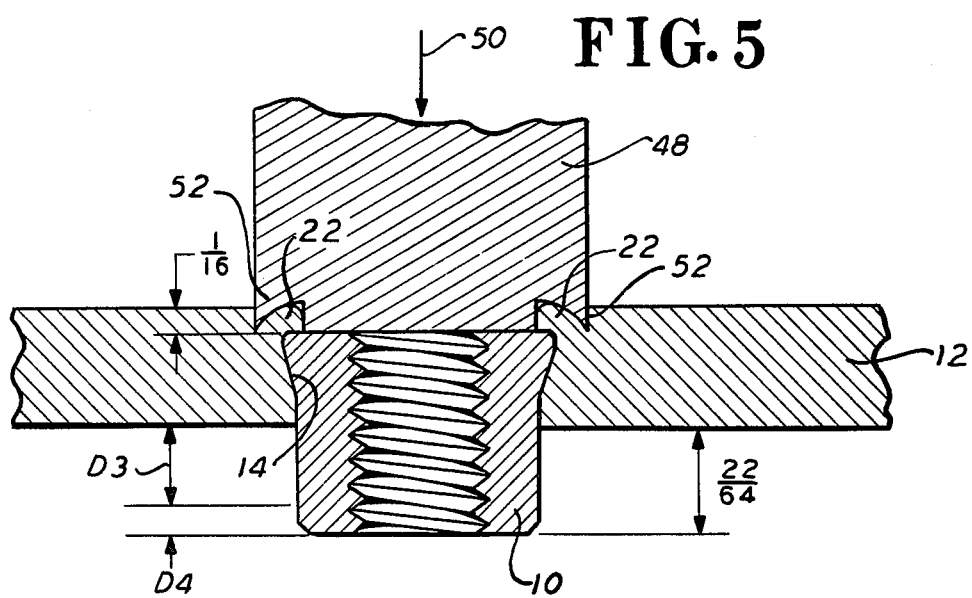
FIG. 5 illustrates the forcing of the nut into the aperture and the swaging step for locking the nut in the aperture.

An aperture indicated by general numerical designation 14 is formed in the support plate 12 such as for example by a punch 16 and a die 18. As illustrated in FIG. 4, the nut 10 is inserted in the aperture 14, and as illustrated in FIG. 5, the nut is forced into frictional engagement with the support plate 12 and peripheral portions, such as peripheral portions 22 of the support plate surrounding the aperture 14, are swayed into engagement with and over predetermined portions of the top of the nut to lock the nut 10 into the aperture 14 thereby securing the nut to the support plate 12.

Referring now specifically to FIG. 1, the nut 10 which may be used in the practice of the present invention may be, as was in one embodiment thereof, configured and dimensioned as shown. In particular, it will noted that the nut 10 has an upper portion provided with an external surface 24 tapering generally inwardly from the top of the nut to generally the middle of the nut and further has a lower portion provided with an external surface 26 of generally right cylindrical configuration extending from generally the middle of the nut to the bottom of the nut. The nut 10, of course, is provided with a threaded bore 28 extending centrally and longitudinally therethrough.

Figure 3:
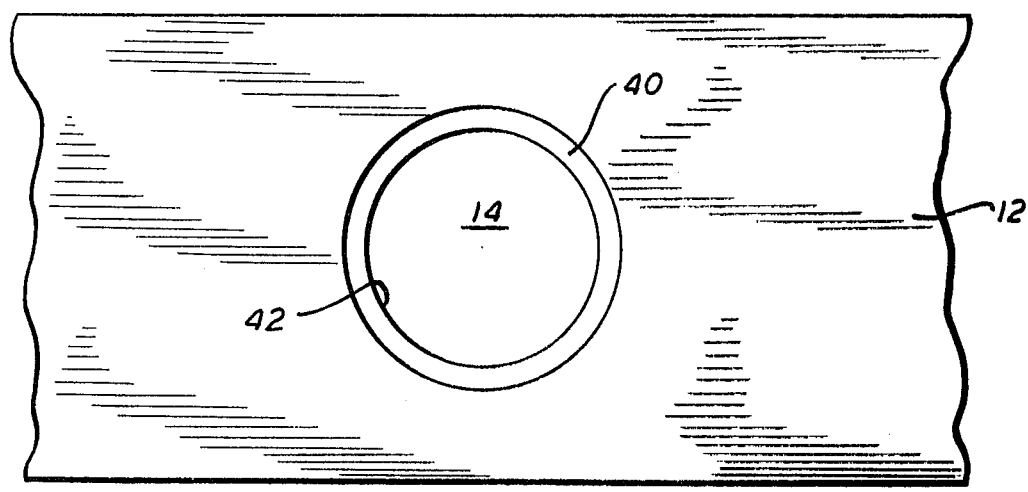
FIG. 3 is a top view of the support plate having the aperture formed therein.

Referring now specifically to FIG. 2, and the step of forming the aperture 14 in accordance with the teaching of the present invention, it will be understood that the aperture 14 may be formed using the punch 16 of generally cylindrical configuration in conjunction with the die 18 having an aperture 32 formed therein of circular configuration predeterminely larger in diameter than the diameter of the punch 16. The punch 16 is advanced in the direction of the arrow 34 a predetermined distance D1 into the support plate 12 whereupon the material of the support plate intermediate the punch 16 and die 18 shears radially outwardly along the length D2 and exits through the die aperture 32. In the practice of the invention embodiment illustrated in FIG. 2, the distance D1 was approximately one fifth of the thickness of the support plate 12 and the distance D2 was approximately four fifths of the thickness of the support plate. Thus, the wall 38 provided by the punching operation defines the aperture 14 and it will be noted that the wall has an upper portion 40 of generally tapered configuration complementary to the generally tapered external surface 24 of the nut 10 and which tapers generally inwardly from the top of the aperture to approximately four fifths of the depth of the aperture, and that the wall 38 has a lower portion 42 of generally right cylindrical configuration complementary to the generally right cylindrical surface 26 of the nut and extending from the tapered portion of the wall to the bottom of the aperture. The configuration of the aperture 14, as shown in cross-sectional view in FIG. 2, may be further understood from FIG. 3 which is a top or plan view of the support plate 12 having the aperture 14 formed therein.

Referring now specifically to FIG. 4, the nut 10 is inserted downwardly into the aperture 14 with the generally tapered external surface 24 of the nut in loose engagement with the generally tapered upper portion of the wall 38 defined by tapering surface 40, and with the lower portion of the nut defined by surface 26 of generally right cylindrical configuration extending through the lower portion of the aperture defined by the generally right cylindrical surface 42 of the wall 38; the bottom portion of the nut 10 extending through the bottom of the aperture a distance D3.

Figure 6:
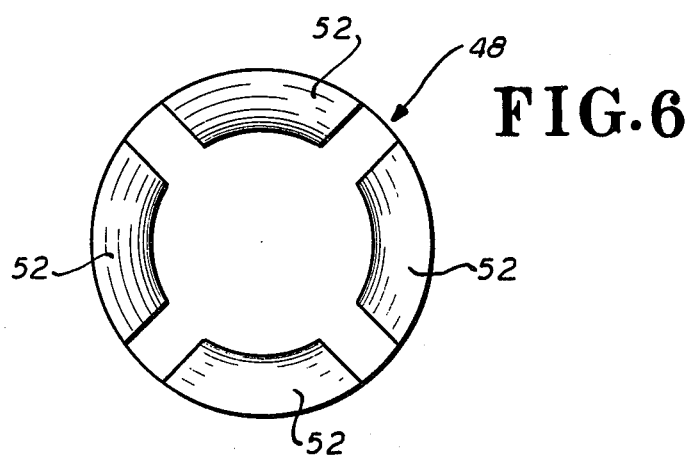
FIG. 6 is an end view of the swaging tool which may be used in the practice of the present invention.

As shown in detail in FIG. 5, a swaging tool 48 may be further used to practice the method of the present invention by advancing the swaging tool in the direction of the arrow 50 into engagement with the top of the nut to force downwardly a predetermined distance D4 into the aperture and to force the generally tapered external surface 24 of the nut into forced frictional engagement with the tapered surface 40 of the wall 38, and concurrently, the cutting teeth or edges 52, spaced peripherally around the end of the swaging tool as may be best seen in FIG. 6, swage peripheral portions 22 of the top of the support plate 12 surrounding the top of the aperture 14 into engagement with and over predetermined peripheral portions of the top of the nut 10 to lock the nut downwardly into the aperture 14 and to prevent the nut from being forced upwardly out of the aperture thereby strongly and securely mechanically structurally interconnecting the nut 10 and support plate 12.

The actual dimensions of the support plate 12, aperture 14, and nut 10 actually used in the practice of one embodiment of the present invention are indicated in detail in FIGS. 1 and 2 to further assist in a detailed understanding of the present invention. However, it will be understood by those skilled in the art, that such actual dimensions are merely by way of illustration and in no manner limit the scope of the method of the present invention. Further, it will be also understood by those skilled in the art, that the terms top, bottom, upper portion, and lower portion, used with regard to the nut 10 and aperture 14 are purely arbitrary and used merely in the comparative or relative sense.

Accordingly, it will be still further understood by those skilled in the art that many variations and modifications may be made in the present method invention without departing from the spirit and the scope thereof.

I claim:

1. Method of securing a metal nut to a metal support plate, the nut having (i) an upper portion provided with an external surface tapering generally inwardly from the top of the nut to generally inwardly from the top of the nut to generally the middle of the nut, and (ii) a lower portion provided with an external surface of generally right cylindrical configuration extending from generally the middle of the nut to the bottom of the nut, comprising the steps of:

forming an aperture in the support plate, the aperture defined by a wall having (i) an upper portion of generally tapered configuration complementary to the generally tapered external surface of the nut and tapering generally inwardly from the top of the surface to approximately four fifth of the depth of the aperture, and (ii) a lower portion of generally right cylindrical configuration complementary to the generally right cylindrical external surface of the nut and extending from the tapered portion of the wall to the bottom of the aperture;

inserting the nut downwardly into the aperture with the generally tapered external surface of the nut in loose engagement with the generally tapered portion of the wall defining the aperture and with the lower portion of the nut of generally right cylindrical configuration extending through the generally right cylindrical portion of the wall; and forcing the nut downwardly a predetermined distance into the aperture to force the generally tapered external surface of the nut, and thereby the upper portion of the nut, into tight frictional engagement with the generally tapered upper portion of the wall and concurrently swaging predetermined peripheral portions of the support plate surrounding the top of the aperture into engagement with and over predetermined peripheral portions of the top of the nut to lock the nut downwardly in the aperture and to prevent the nut from being forced upwardly out of the aperture thereby securing the nut to the support plate.

* * * * *